G. W. REYNOLDS.
CONTROL LEVER.
APPLICATION FILED FEB. 23, 1917.
1,276,114.
Patented Aug. 20, 1918.
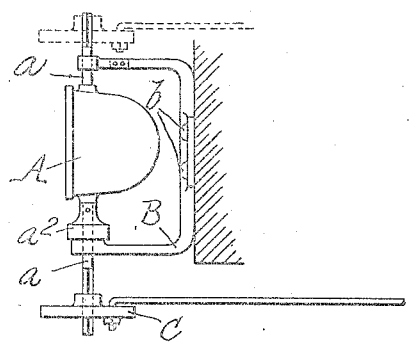
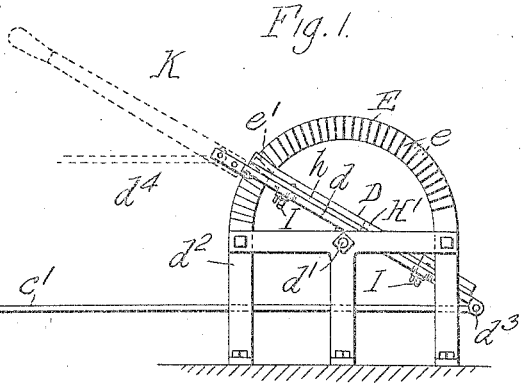
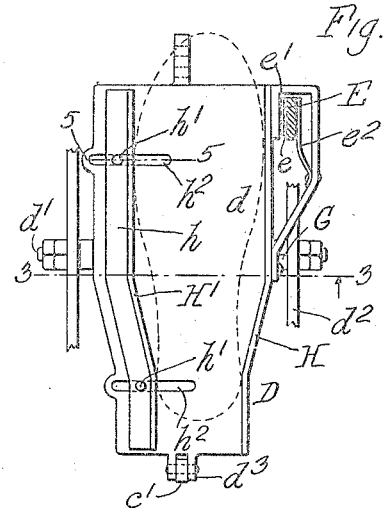
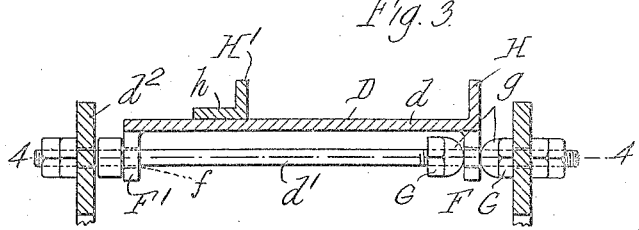
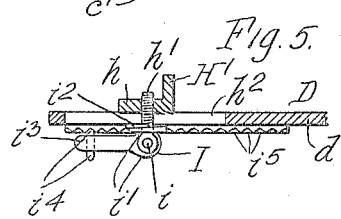
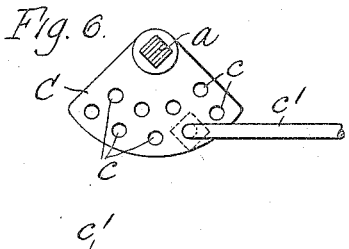
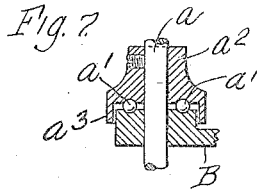
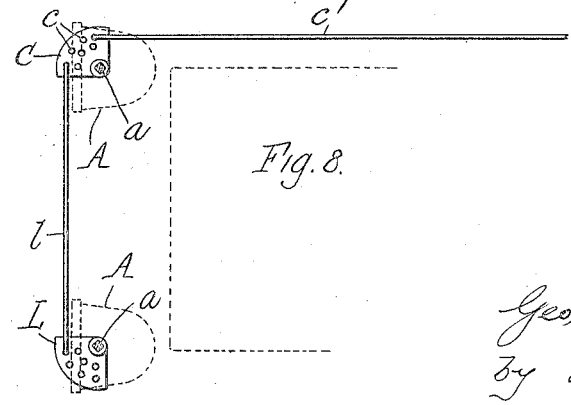
Inventor.
George W. Reynolds.
By Wilhelm & Parker.
Attorneys.

UNITED STATES PATENT OFFICE.

GEORGE W. REYNOLDS, OF ROCK GLEN, NEW YORK.

CONTROL-LEVER.

1,276,114.  Specification of Letters Patent.  Patented Aug. 20, 1918.

Application filed February 23, 1917. Serial No. 150,311.

*To all whom it may concern:*

Be it known that I, GEORGE W. REYNOLDS, a citizen of the United States, residing at Rock Glen, in the county of Wyoming and State of New York, have invented a new and useful Improvement in Control-Levers, of which the following is a specification.

This invention relates to control levers of the kind adapted to be used, for example, for adjusting the headlights of an automobile, locomotive, or other vehicle, for the purpose of directing the rays of light to the front or to either side of the vehicle.

The objects of the invention are to provide means of improved construction for adjusting headlights of vehicles either by hand or by foot and which hold the headlight in the adjusted position; also to provide adjusting means of this kind with a foot lever of improved construction; also to improve the construction of adjusting mechanisms of this kind in other respects hereinafter specified.

In the accompanying drawings:

Figure 1 is a side elevation of a headlight and an adjusting mechanism therefor embodying the invention.

Fig. 2 is a top plan view, on an enlarged scale, of the adjusting mechanism.

Fig. 3 is a transverse sectional elevation thereof on line 3—3, Fig. 2, on a still larger scale.

Fig. 4 is a sectional plan view thereof on line 4—4, Fig. 3.

Fig. 5 is a fragmentary transverse sectional elevation thereof on line 5—5, Fig. 2.

Fig. 6 is a plan view of an adjusting segment secured on the pivotal axis of the headlight.

Fig. 7 is a fragmentary central sectional elevation of the pivotal bearing of the headlight.

Fig. 8 is a top plan view showing the connections between two headlights.

A represents a headlight of a vehicle which is provided with vertical pivots or shafts $a$ $a$ secured to the upper and lower parts of the headlight and journaled in a substantially U-shaped frame B. Any portion of the frame B may be secured to a suitable support or portion of a vehicle, the upright portion of the bracket being in the construction shown secured to a support by means of securing devices $b$ of any suitable kind. The lamp is preferably journaled in the bracket B by means of a ball bearing comprising a series of balls $a'$ adapted to operate in ball races in the lower arm of the bracket B and in a cap or bearing member $a^2$ secured on the shaft $a$ and having a downwardly depending flange $a^3$ which protects the bearing against dust and rain. All of these parts may be of any usual or suitable construction.

In order to swing the headlight about its vertical pivots, an adjusting plate or member C is preferably secured on one or the other of the shafts $a$, that shown being segmental in form and provided with a plurality of holes $c$ in which the end of a connecting link $c'$ may be secured. In order to enable the headlight to be used on any desired type of vehicle, the segmental member may be secured either on the upper or lower of the shafts $a$, and may be adjustable vertically on the shaft. Other means for connecting the actuating link $c'$ with either pivotal shaft of a headlight may be employed.

The headlight is adapted to be adjusted about its pivotal axis by means of a lever pivoted on the vehicle and operatively connected with the headlight. In the construction shown, a foot lever D is provided for this purpose which comprises a plate $d$ on which a foot of the operator is adapted to rest and which is pivoted on a rod $d'$ secured on a supporting frame $d^2$ of any suitable structure. The foot lever is pivotally connected at $d^3$ with the connecting link $c'$, which connecting link may be in the form of a single rod. If desired, the link connecting the foot lever with the segmental plate of the headlight may be connected to the foot lever at the upper portion thereof, as shown in dotted lines at $d^4$.

Means are preferably provided for holding the lever in adjusted position. In the construction shown for this purpose an arc-shaped toothed member E is arranged on the foot lever supporting frame $d^2$ and is provided on one face with a plurality of teeth or projections $e$ with which a tooth $e'$ of the foot lever is adapted to engage, the other face of the foot lever being engaged by a spring $e^2$ which yieldingly moves the foot lever relatively to the segmental toothed member so as to cause the tooth of the foot lever to engage between the teeth of the segmental member. In order to enable the foot lever to move into and out of engagement with the teeth of the segmental member, the following construction is preferably employed.

The lower face of the plate $d$ of the foot lever is provided with a lug F having a substantially circular hole through which the rod $d'$ extends and with a lug F' having an elongated hole or slot $f$ which permits the foot lever to swing about the lug F. In order to hold the foot lever in place on the rod $d'$, two retaining nuts G are preferably secured on the rod $d'$ at opposite sides of the lug F and are provided with rounded faces $g$ which permit the foot lever to be shifted to a limited extent about the connection between the rod $d'$ and the lug F. In order to disengage the tooth $e'$ of the foot lever from the toothed segment E the foot resting on the lever is turned sidewise in such a manner as to move the foot lever about the lug F against the action of the spring $e^2$. The foot lever is then swung about the rod $d'$ to adjust the headlight and when pressure is released from the foot lever, the tooth $e'$ again engages with the toothed segment E.

In order to facilitate the shifting of the foot lever about the lug F, the plate $d$ of the foot lever is provided at one side with an upwardly extending fixed flange or projection H, and at the other side with an adjustable flange H', the two flanges being so arranged that the foot of the operator may enter between the two flanges to facilitate the shifting of the foot lever by a turn of the foot. The flange H' is adjustable relatively to the fixed flange H so that the two flanges may be spaced to conform to the operator's foot. For this purpose the adjustable flange H', in the construction shown, is substantially of angle-shaped cross-section, having a base or part $h$ arranged parallel with and bearing on the foot lever D and is provided with bolts or pins $h'$ extending through slots $h^2$ in the foot lever, the bolts in the construction shown being threaded and secured in correspondingly threaded holes in the base $h$. Any suitable means may be provided for adjustably securing the flange H' on the plate $d$ of the foot lever. In the construction shown for this purpose a cam or eccentric I is provided which is pivoted at $i$ to the bolt $h'$ and which has two eccentric portions $i'$ $i'$ at opposite sides thereof which are adapted to bear against a spring washer $i^2$. The eccentric is provided with a handle $i^3$ which is so arranged that when the handle is swung into a plane substantially parallel with the plate $d$ of the foot lever the eccentric will draw the movable flange H' firmly against the foot lever. The handle is adapted to swing in either direction to bring either of the eccentric portions into operative relation to the spring washer and is preferably provided with projections or teeth $i^4$ adapted to engage in notches or grooves $i^5$ on the lower face of the plate $d$ of the foot lever to prevent the handle from turning and thus unscrewing the bolt $h'$.

If it is desired to operate the headlights by hand, a hand lever can easily be secured to the foot lever as indicated at K in dotted lines in Fig. 1.

When two headlights are employed, as in the case of automobiles, one of the headlights may be connected with the link $c'$ as described and the other headlight may be provided with a perforated segmental plate L similar to the plate C, and connected with the plate C by means of a link $l$.

The device described has the advantage of being readily adaptable to any type of vehicle and of being easy to operate. The headlight is held in any adjusted position, and to change the adjustment it is only necessary to twist the foot and tilt the foot lever. The adjustment of the movable flange to adapt the foot lever to the operator's foot can be easily made and the flanges insure a positive operation of the lights.

The lever described may be used in connection with any desired mechanism and it is not intended to limit the lever embodying the invention for use in adjusting headlights.

I claim as my invention:

1. In an adjusting mechanism for headlights, a foot lever comprising a plate on which the foot is adapted to rest, a flange at one side of said plate, and a second flange adjustably secured on said plate, said flange having a base portion adapted to be clamped on said plate in various positions relatively to said fixed flange.

2. In an adjusting mechanism for headlights, a foot lever comprising a plate on which the foot is adapted to rest, a flange at one side of said plate, and a second flange adjustably secured on said plate, bolts secured to said flange and extending through slots in said plate, eccentrics pivoted on said bolts, and means for clamping said flange on said plate by swinging the said eccentrics about their pivots.

3. In an adjusting mechanism for headlights, a foot lever comprising a plate on which the foot is adapted to rest, a flange at one side of said plate, and a second flange adjustably secured on said plate, bolts having a threaded engagement with said flange and extending through slots in said plate, eccentrics pivoted to said bolts and adapted to be swung about on their pivots to clamp said flange on said plate, projecting members on said eccentrics, and grooves on the lower face of said plate with which said projecting members are adapted to engage to hold said bolts against turning.

Witness my hand this 17th day of February, 1917.

GEORGE W. REYNOLDS.

Witnesses:
J. OLIN WAITE,
HENRY J. SMITH.